United States Patent [19]

Litman

[11] 4,241,252

[45] Dec. 23, 1980

[54] FLEXIBLE LEAF CONTACT SYSTEM FOR NIGHT VISION OPTICAL INSTRUMENTS

[75] Inventor: Alan Litman, Pittsburgh, Pa.

[73] Assignee: Smith & Wesson Chemical Company, Inc., Pittsburgh, Pa.

[21] Appl. No.: 39,934

[22] Filed: May 17, 1979

Related U.S. Application Data

[63] Continuation of Ser. No. 887,690, Mar. 17, 1978, abandoned.

[51] Int. Cl.³ ............................................. H01J 31/50
[52] U.S. Cl. ............................................. 250/213 VT
[58] Field of Search ......................... 339/9 R, 252, 28; 250/239, 213 R, 213 VT, 215; 358/211; 313/94

[56] References Cited

U.S. PATENT DOCUMENTS

| | | | |
|---|---|---|---|
| 3,971,933 | 7/1976 | Adamson | 250/213 VT |
| 4,067,045 | 1/1978 | Provost et al. | 358/211 |

*Primary Examiner*—David C. Nelms
*Attorney, Agent, or Firm*—Patrick J. Walsh

[57] ABSTRACT

Disclosed is an electrical contact system for a night vision optical instrument having a cylindrical housing body intermediate an objective lens and an ocular. An intensifier tube is carried within the body for relative movement therebetween whereby the objective lens carried by the body and the intensifier tube are longitudinally adjustable relative to one another. Electrical leaf contacts, one of which is electrically connected to a battery carried by the housing body, are carried by and extend into the path of movement of the intensifier tube. The distal ends of the leaf contacts are maintained in electrical contact with electrical terminals on the end face of the intensifier tube throughout the range of relative movement between the intensifier tube and housing body.

1 Claim, 4 Drawing Figures

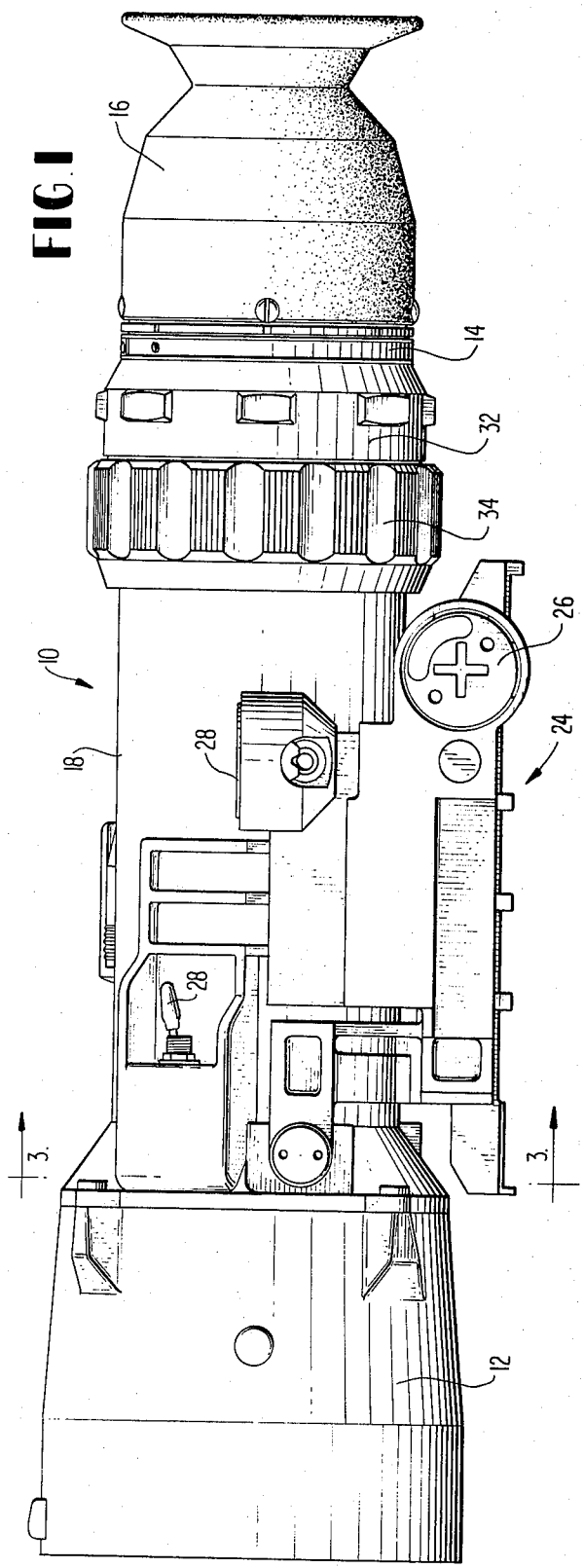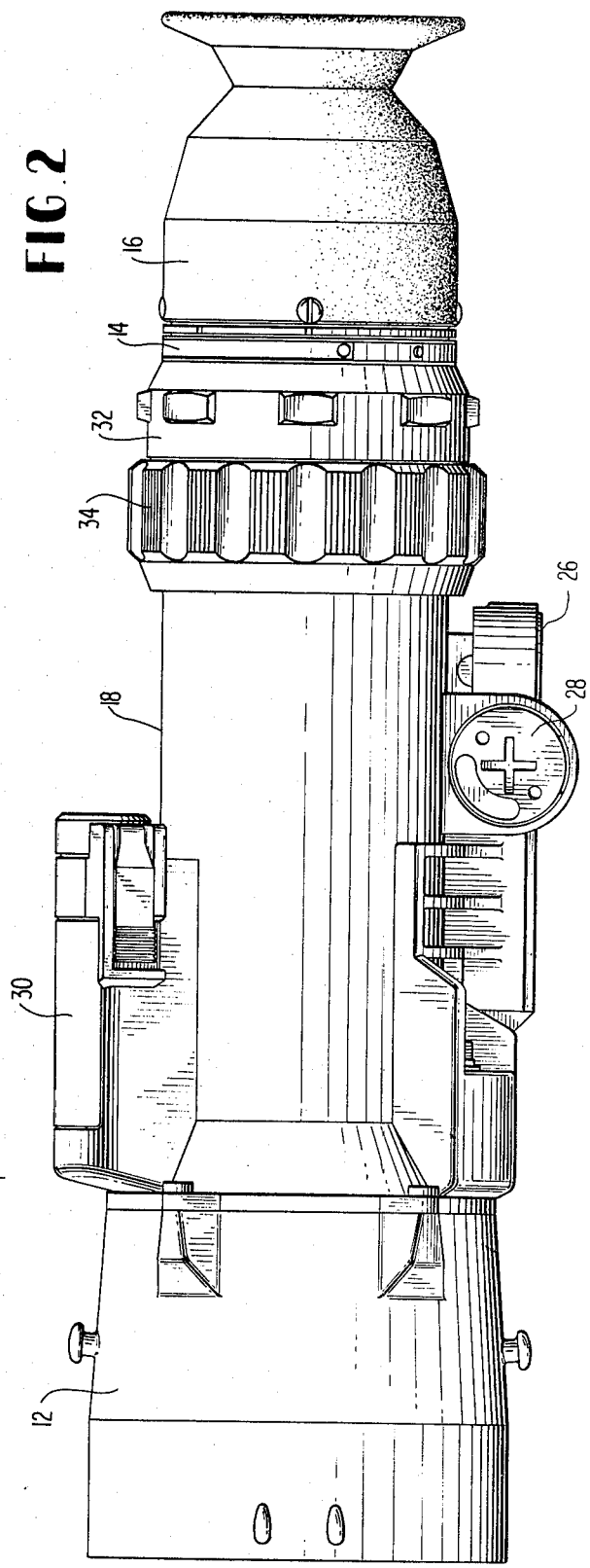

FLEXIBLE LEAF CONTACT SYSTEM FOR NIGHT VISION OPTICAL INSTRUMENTS

This is a continuation of application Ser. No. 887,690, filed Mar. 17, 1978 now abandoned.

The present invention relates to an optical instrument and particularly relates to an electrical leaf contact system for maintaining electrical contact between a power supply and an electrically actuated imaging device movable within the instrument housing.

In conventional night vision optical instruments, there is usually provided an objective lens, an imaging device, for example a photomultiplier or intensifier tube, and an ocular. A focusing ring is provided to afford relative movement between the intensifier tube and the objective lens in order to focus these two elements. A focusing ring is also provided to focus the ocular relative to the image provided by the intensifier tube. The intensifier tube is electrically actuated, for example by means of an electrical circuit including a battery and switch carried by the instrument housing. It is and has been a problem to maintain effective electrical contact between the electrical circuit carried by the housing and the intensifier tube particularly in view of the relative movement between the intensifier tube and the instrument housing when the instrument is focused.

Sliding electrical contacts between the instrument housing and intensifier tube have been considered. It has been found, however, that the sliding causes the contact surfaces to pit and become electrically inefficient. Also, where the sliding contacts comprise spring leaf contacts, there is a tendency for the contact springs to chatter and lose their spring bias under operational conditions. That is, the springs would vibrate, sometimes at resonant frequency, in response to the multidirectional vibrational forces imparted to the instrument, for example when the instrument is used in connection with a weapon and the weapon is fired.

The present invention provides a novel and improved electrical leaf contact system for an optical instrument wherein effective electrical contact is maintained between the portion of the electrical circuit carried by the housing, i.e. the battery and switch, and the electrical circuit of the intensifier tube throughout the entire range of relative movement of the intensifier tube and housing body. To accomplish this, the present invention provides, in an optical instrument having a cylindrical housing body, an intensifier tube movable axially relative to the body, and a pair of electrical leaf contacts each having one end fixed to a terminal block on the housing at a location radially outwardly of the intensifier tube. The contacts extend inwardly into the path of movement of the intensifier tube, i.e. within its peripheral confines, and contact is maintained by connection between the distal ends of the leaf contacts and terminals carried by the end face of the intensifier tube. The contact leafs are each coated to reduce or eliminate vibration when the instrument is subjected to anticipated vibration thereby eliminating chatter and the loss of good electrical efficiency.

Accordingly, it is a primary object of the present invention to provide a novel and improved electrical contact system for an optical instrument of the type having an electrically actuated imaging device.

It is another object of the present invention to provide a novel and improved electrical contact system for an optical instrument of the type using an electrically actuated imaging device wherein relative movement is provided between the imaging device and the housing.

It is another object of the present invention to provide a novel and improved electrical contact system for an optical instrument of the type having an imaging device movable relative to the instrument housing and wherein effective electrical contact is maintained between the imaging device and a power supply carried by the housing throughout the range of relative movement of the imaging device and housing.

It is a further object of the present invention to provide a novel and improved electrical contact system for an optical instrument of the type having an electrically actuated imaging device and a housing relatively movable one to the other wherein the contacts constitute leaf springs carried by the housing and which extend into the path of movement of the imaging device.

It is a still further object of the present invention to provide a novel and improved electrical contact system for an optical instrument having the foregoing characteristics and wherein the contacts are substantially vibration free.

To achieve the foregoing objects and in accordance with the purpose of the present invention, as embodied and broadly described herein, the electrical contact system of the present invention, which is useful with an optical instrument having a housing and an electrically actuated imaging device carried thereby, the housing and imaging device being relatively movable one to the other, a pair of flexible elongated leaf contacts each of which is connected at one end to the instrument housing, a pair of electrical terminals carried by the electrically actuated imaging device, and means for maintaining the opposite ends of the contacts in electrical contact with the terminals upon relative movement of the instrument housing and imaging device.

Preferably, the leaf contacts are fixed to terminals on the annular end face of the housing and extend within the peripheral confines of the imaging device for contact and connection with the terminals on the end face of the imaging device. Also, the leaf contacts are coated with a plastic material, preferably vinyl, to reduce or eliminate vibration when the instrument is subjected to anticipated vibration under operating conditions.

These and other objects and advantages of the present invention will become more apparent upon reference to the following specification, appended claims and drawings wherein:

FIG. 1 is a side elevational view of an optical instrument incorporating the novel and improved electrical contact system of the present invention;

FIG. 2 is a top plan view thereof;

Reference will now be made in detail to the present preferred embodiment of the invention, an example of which is illustrated in the accompanying drawings.

Figure 4:
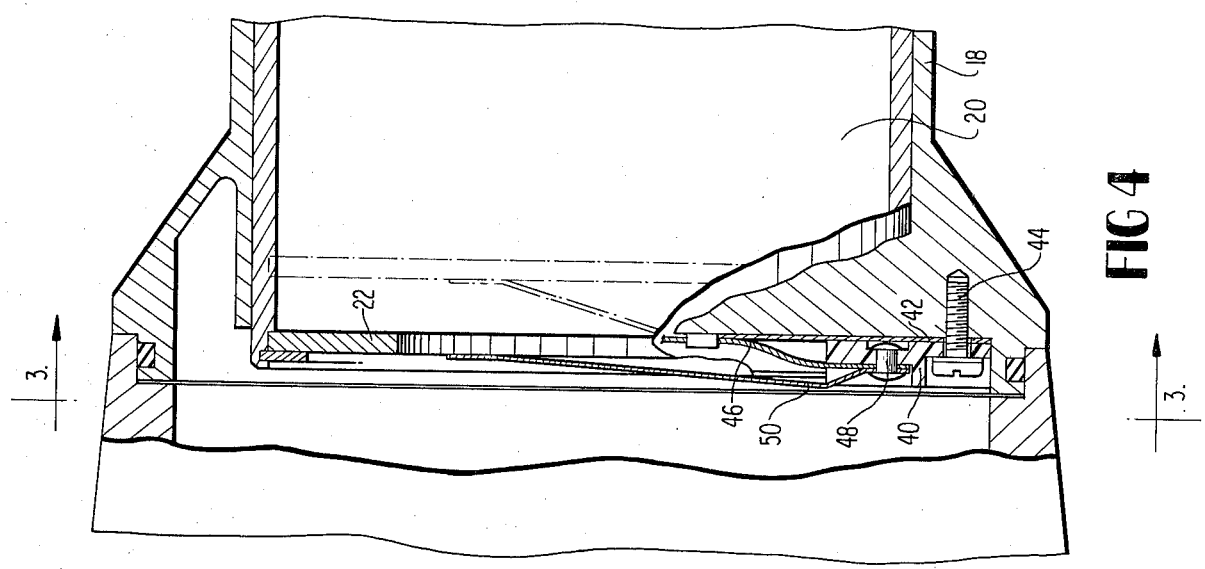
FIG. 4 is a fragmentary enlarged elevational view of the forward face of the imaging device with parts broken out and in cross section illustrating the electrical contact system hereof.

Referring now to FIGS. 1 and 2, there is illustrated an optical instrument, in the present instance a night vision scope for a rifle, generally designated 10, and having at one end an objective lens 12, and at its opposite end an ocular 14 with attached eye piece 16. Instrument 10 also includes a cylindrical body tube 18, intermediate objective lens 12 and ocular 14, and which body tube houses an imaging device 20 for example a photomultiplier or an intensifier tube, having a screen or window 22 along its forward face (FIG. 4). The imaging device is cylindrical and slidably but non-rotationally disposed within the body tube 18. Supporting instrument 10, for example on the barrel of a rifle, is a mount, generally designated 24, in which azimuth and elevational adjustment mechanisms are provided. These adjustment mechanisms form no part of the present invention and further description thereof is therefore not believed necessary, it being sufficient to note that these adjustments are provided by rotating the azimuth and elevational adjusting screws 26 and 28, respectively. Also carried on intermediate body tube 18 is switch 28 which is electrically connected to a power source, in this instance batteries, not shown, disposed in housing 30 on intermediate tube 18, and to intensifier tube 20, in a manner disclosed in the ensuing description.

There is also provided, by means not shown, a mechanism for adjusting the focus of the ocular relative to the intensifier tube 20, it being sufficient for present purposes to note that such adjustment is accomplished by an ocular focusing adjustment ring 32. There is also provided a mechanism, not shown, responsive to rotation of the focus ring 34 for axially displacing the intermediate body tube 18 and objective lens 12, on the one hand, and the intensifier tube 20, ocular 14 and eye piece 16 on the other hand, relative to one another in order that intensifier tube 20 and objective lens 12 can be properly focused. The range of axial displacement is illustrated in FIG. 4 by the full and dashed line positions of the forward face or window 22 of intensifier tube 20. As noted previously, the present invention relates to a novel and improved electrical contact system for intensifier tube 20 whereby power from a power source is effectively connected to intensifier tube 20 throughout the full range of relative movement between the intermediate body tube 18 carrying the power source and the intensifier tube.

Figure 3:
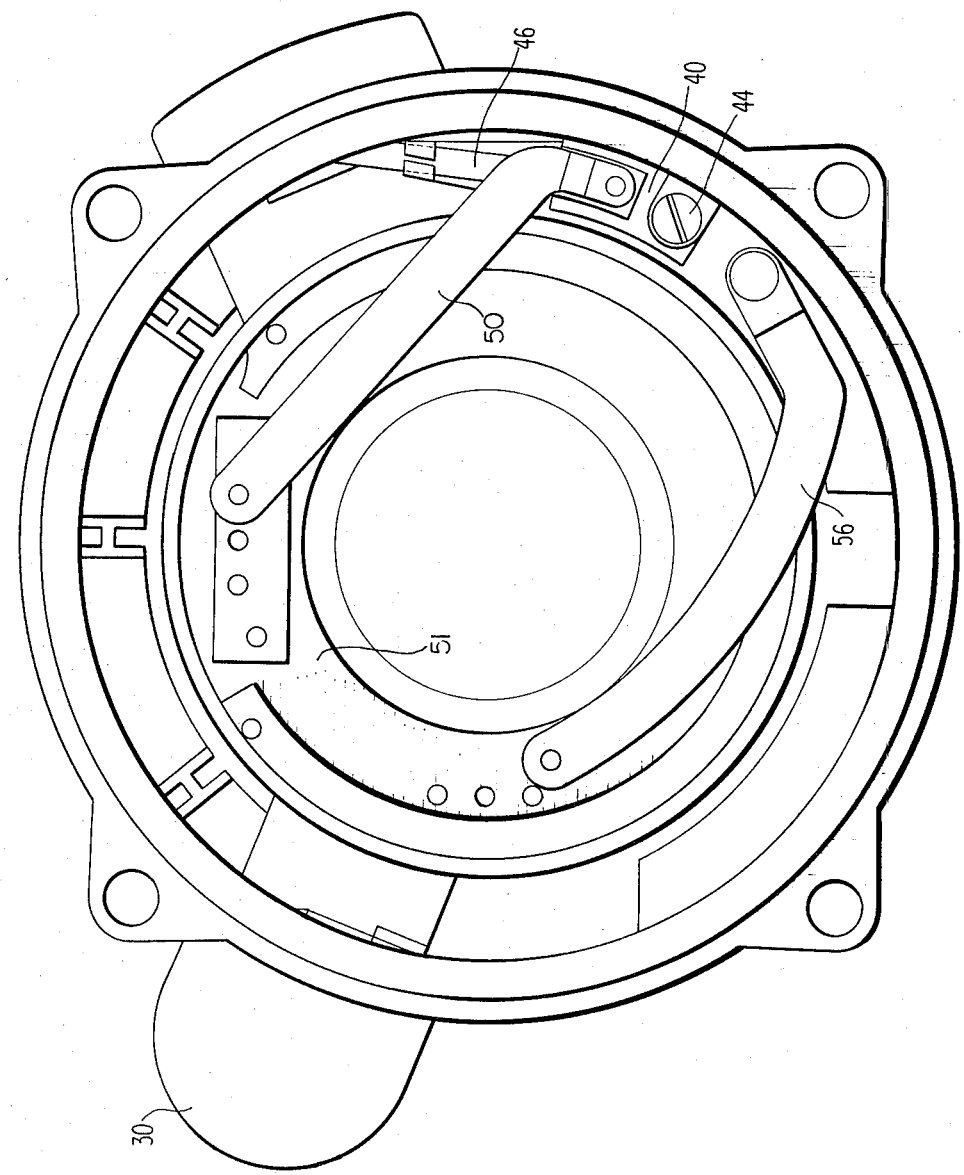
FIG. 3 is a cross-sectional view thereof taken generally on line 3—3 in FIG. 1.

To accomplish this, and referring now particularly to FIGS. 3 and 4, a terminal block 40, in the form of a cylindrical segment, is secured to the annular end face 42 of intermediate tube 18 by a bolt 44. An electrical lead 46 comprising a wire braid is coupled to switch 28 and is secured to the terminal block by a rivet 48. In electrical contact with electrical lead 46 and also secured to terminal block 40 by rivet 48 is an elongated electrical leaf contact 50. Contact 50 is formed of a flat flexible electrically conductive metal. Electrical contact 50 extends inwardly within the peripheral confines of intensifier tube 20 and into its path of movement to overlie window or screen 22. The distal end of electrical leaf contact 50 is connected to and lies in electrical contact with a terminal formed on an annulus or ring 51 overlying the window or screen 22, the terminal on the ring being connected in turn to the electrical circuit, not shown, forming part of the intensifier tube 20. The ring 51 and leaf contact 50 are preferably pinned one to the other.

Also connected to the annular end face of intermediate tube 18, for example by means of a rivet, is a similar elongated electrical leaf contact 56. Similarly as contact 50, contact 56 extends inwardly within the peripheral confines of the intensifier tube 20 and into the path of movement of the intensifier tube for connection to and electrical contact with a second terminal formed on ring 51 overlying screen or window 22. The terminal, to which the distal end of leaf contact 56 is in electrical contact, forms part of the electrical circuit for the intensifier tube 10. The ring 51 and leaf contact 56 are preferably pinned one to the other.

With this arrangement, the electrical leaf contacts 50 and 56 are positively secured at their distal ends to the terminals on the ring 51 overlying the end face of screen 22 and thus the leaf contacts 50 and 56, except for their connection to tube 18, move longitudinally with the intensifier tube 20. Contacts 50 and 56 have sufficient play or flexibility, as they project from the terminal 40 first in a forward axial direction and then secondly in a rearward axial direction to overlie window 22, to enable positive securement between the contacts and the terminals throughout the full range of relative movement between window 22 and body tube 18 as illustrated in FIG. 4.

Preferably, leaf contacts 50 and 56 are coated with a plastic material, such as vinyl, substantially for the entirety of their lengths. This coating serves to reduce or eliminate vibration of the leaf contacts when the instrument is subjected to vibrations caused by operation of associated equipment for example an automatic rifle. The coatings also permit sufficient flexibility or play in the contacts to enable relative movement between the intensifier tube 20 and the body tube 18.

Thus, it will be appreciated that electrical contact between the power source through switch 28 is maintained at all times throughout the full range of relative movement between the intensifier tube 20 and intermediate tube 18.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical instrument comprising:
   a generally elongated and cylindrical housing having a generally annular face,
   a terminal block mounted on said face,
   an electrically actuated light intensifier tube carried by said housing, said intensifier tube having an end face, an annular ring carried by said intensifier tube about its end face,
   an objective lens carried by said housing forwardly of said intensifier tube,
   said intensifier tube being disposed concentrically within said housing for movement of said housing and intensifier tube relative to one another in the direction of the longitudinal axis of said cylindrical housing,
   a pair of flexible, elongated electrical leaf contacts each connected at one end to the instrument housing, one of said leaf contacts being secured at one end to said terminal block and extending inwardly therefrom for contact with the terminal on the end face of said intensifier,
   a pair of electrical terminals disposed on the end face of said electrically actuated intensifier tube, said terminals being carried by said annular ring,
   means for maintaining the opposite ends of said contacts in electrical contact with said terminals upon relative movement of said housing and said intensifier tube, said contacts being disposed to one side of said housing with at least one contact extending into the path of movement of said imaging device, a battery carried by said housing, means for transmitting power from said power source to said terminal block and said one contact including a switch carried by said housing, and each of said leaf contacts having a plastic coating substantially the entirety of its length to reduce contact leaf vibration.

* * * * *